United States Patent [19]
Verzwyvelt et al.

[11] Patent Number: 6,054,842
[45] Date of Patent: Apr. 25, 2000

[54] METHOD FOR IMPROVING BATTERY DISCHARGE PERFORMANCE

[75] Inventors: Scott Anthony Verzwyvelt, Maple Valley; Robert Ross Matson, Enumclaw, both of Wash.

[73] Assignee: The Boeing Company, Seattle, Wash.

[21] Appl. No.: 09/122,425

[22] Filed: Jul. 24, 1998

[51] Int. Cl.⁷ .................................................. H01M 10/46
[52] U.S. Cl. ............................................ 320/135; 320/136
[58] Field of Search .................................... 320/136, 135, 320/134, 128, 150; 324/431; 340/636; 361/92; 429/61, 62

[56] References Cited

U.S. PATENT DOCUMENTS

| | | |
|---|---|---|
| 3,617,850 | 11/1971 | Domshy . |
| 3,654,426 | 4/1972 | Brinkmann et al. . |
| 4,112,199 | 9/1978 | Dunlop et al. ............................ 429/29 |
| 4,507,368 | 3/1985 | Hashimoto ............................... 429/62 |
| 4,567,119 | 1/1986 | Lim ......................................... 429/59 |
| 4,680,241 | 7/1987 | Dyer ........................................ 429/49 |
| 5,055,656 | 10/1991 | Farah et al. . |
| 5,215,834 | 6/1993 | Reher et al. ............................. 429/62 |
| 5,356,735 | 10/1994 | Meadows et al. ..................... 429/120 |
| 5,362,942 | 11/1994 | Vanderslice, Jr. et al. ............. 429/62 |
| 5,395,706 | 3/1995 | Hall ......................................... 429/50 |
| 5,395,708 | 3/1995 | Hall . |
| 5,410,238 | 4/1995 | Ishizuka et al. . |
| 5,429,888 | 7/1995 | Hall ......................................... 429/50 |
| 5,508,126 | 4/1996 | Braun ........................................ 429/7 |
| 5,599,636 | 2/1997 | Braun . |
| 5,834,131 | 11/1998 | Lutz et al. ............................... 429/62 |

OTHER PUBLICATIONS

Lim, H.S., et al., "Electrochemical Behavior of Heavily Cycled Nickel Electrodes in $Ni/H_2$ Cells Containing Electrolytes of Various KOH Concentrations," *Electrochemical Society Proceedings*, vol. 90–4, 1990, pp. 341–355.

Lim, H.S., et al., "The Effect of Different Alkali Metal Hydroxides on Nickel Electrode Life," *Proceedings of the 23rd Intersociety Energy Conversion Engineering Conference*, Jul. 31–Aug. 5, 1988, pp. 457–463.

*Primary Examiner*—Edward H. Tso
*Attorney, Agent, or Firm*—Christensen, O'Connor Johnson & Kindnesspllc

[57] ABSTRACT

A method for improving battery discharge voltage is disclosed. In the method, the battery discharge voltage is improved by increasing battery temperature during discharge. The method is useful in extending the life of nickel electrode rechargeable batteries including those employed as spacecraft power sources.

23 Claims, 8 Drawing Sheets

METHOD FOR IMPROVING BATTERY DISCHARGE PERFORMANCE

FIELD OF THE INVENTION

The present invention generally relates to a method for improving battery discharge performance and, more particularly, to method for improving battery discharge performance by thermal control.

BACKGROUND OF THE INVENTION

Batteries are the primary energy storage medium on satellites. Long battery life is desired for space applications because the service life of a spacecraft often depends on battery life and excess battery cycle life can be traded for lighter weight. Nickel electrode rechargeable batteries dominate spacecraft energy storage. The dominance of nickel electrode batteries, particularly nickel hydrogen batteries, is expected to continue through at least the year 2010.

Batteries provide power to satellite payload devices during eclipse periods. Depending on the satellite's orbit, some eclipse discharge seasons can last several hundred cycles. However, after repeated charge/discharge cycles, nickel electrode based batteries' discharge voltage performance degrades to lower, unuseful levels. A consequence of battery age is that, in extreme circumstances, satellite eclipse loads cannot be supported at adequate voltages.

Conventionally, lower discharge voltage performance of rechargeable batteries has been corrected by battery reconditioning. Reconditioning is typically accomplished during extended periods of continuous sunlight that do not require load support. Reconditioning is generally not practiced during eclipse because it places the satellite in energy balance jeopardy which can result in spacecraft loss. In reconditioning, battery cells are discharged to near depletion, often over a highly resistive load. For nickel electrode batteries, complete discharge typically converts nickel electrode active material, which has become a bimodal crystal phase structure, back to a single crystal phase material. The single crystal phase active material provides higher discharge voltage performance and an improvement in charge efficiency. However, the positive effects of battery reconditioning are only temporary. Within about 100 charge/discharge cycles, the battery reverts back to its normal bimodal crystal phase structure. The bimodal structure is characterized by having relatively lower charge transfer between the active material's crystal phases and also results in reduced ionic conductance within the battery.

As noted above, depending upon the satellite's orbit, some eclipse discharge seasons can last for several hundred cycles and, for that reason, reconditioning cannot be accomplished with adequate frequency. Moreover, reconditioning is expensive in terms of "ground crew" labor and is also a contributor to increased battery wearout through its high depth of discharge. Furthermore, reconditioning is the primary cause of cell reversal damage and its adverse impact on battery life.

For satellites powered by batteries that suffer from degraded discharge voltage performance and when reconditioning is not feasible, the only option for the satellite is to shed loads by turning off payload devices. The option of shedding loads is disadvantageous because the on-off cycling of payloads accelerates payload device failure. Furthermore, turning off payload devices is economically disadvantageous because the satellite's purpose is payload operation, which is the satellite's base revenue source.

Accordingly, there is a need for improving battery discharge performance. More specifically, there exists a need for improving battery discharge performance without reconditioning. This need exists for improving battery discharge performance aboard any spacecraft that experiences long eclipse seasons and high battery discharge demands. The present invention seeks to fulfill these needs and provides further related advantages.

SUMMARY OF THE INVENTION

The present invention provides a method for improving battery discharge voltage. In the method, battery discharge voltage is significantly improved by increasing battery temperature during discharge beyond that which occurs during normal vehicle operation. The method for increasing battery discharge voltage is particularly advantageous in extending the useful life of nickel electrode rechargeable batteries including those batteries employed as spacecraft energy storage.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
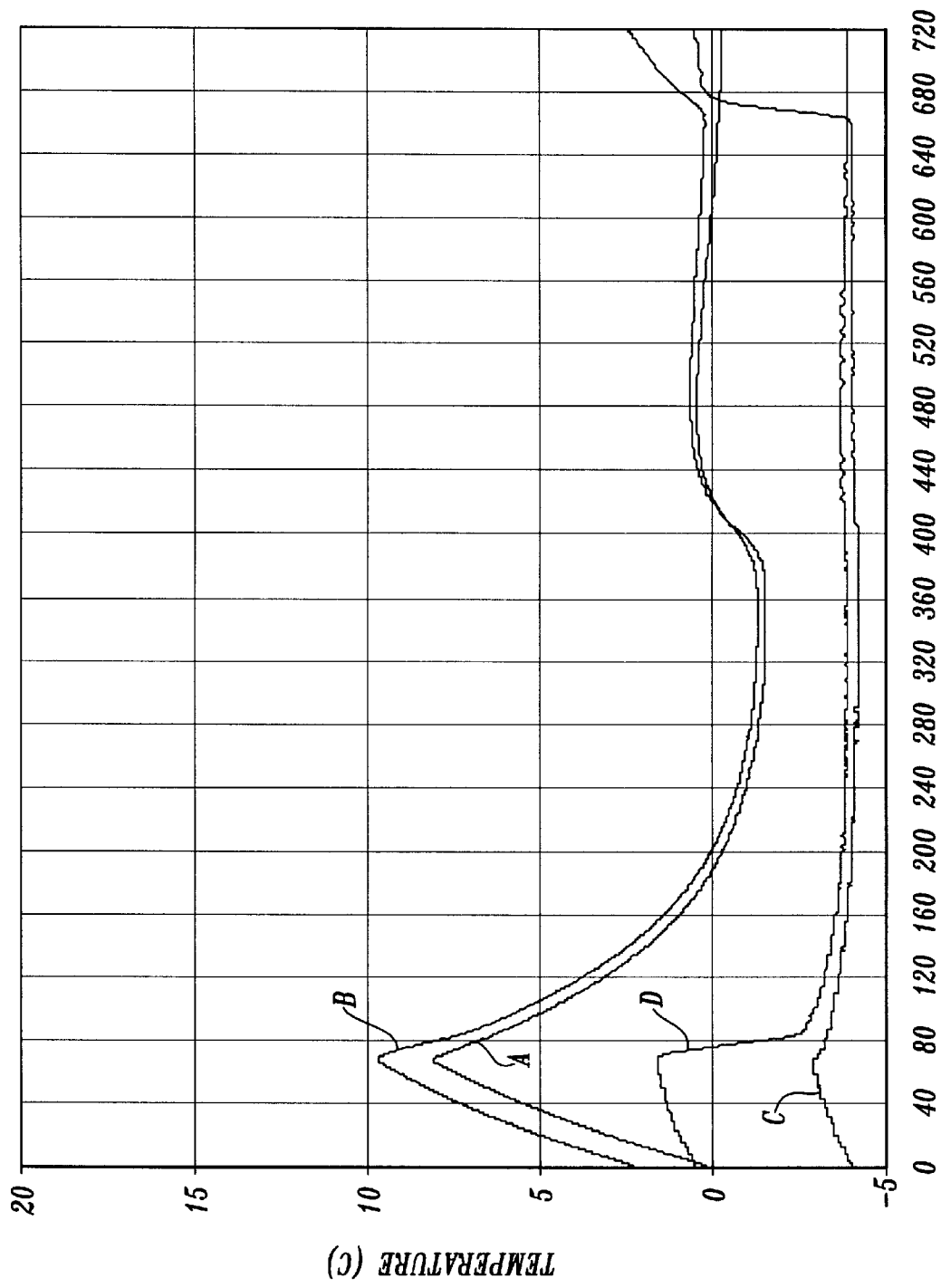
FIG. 1 is a comparison of temperature profiles for successive discharge/charge cycles for a nickel hydrogen alkaline storage battery (28 volt) having a cell design that includes an asbestos separator and no wall wick; profile A illustrates battery temperature (° C.) measured on the cell at 3.8 inches above the battery baseplate over cycle time (min.) for a standard cycle; profile B illustrates battery temperature for a cycle after increasing the battery coolant temperature by 4° C. one hour before discharge; and profiles C and D illustrate battery coolant temperature at the baseplate for profiles A and B, respectively.

The present invention provides a method for improving battery discharge voltage. In the method, battery discharge voltage is increased by increasing battery temperature during discharge. The method provides for increasing battery temperature over that which occurs during discharge under normal vehicle operation. The method for increasing battery discharge voltage is advantageous for extending the useful life of aged, rechargeable batteries, particularly nickel electrode batteries including those batteries employed as spacecraft energy storage.

Spacecraft typically have thermal control mechanisms that strive to obtain relatively constant battery baseplate temperature. In nickel electrode batteries, typical battery temperatures are maintained in the −5° to +10° C. range. Lower operation temperatures suppress oxygen generation, thereby improving charge efficiency and increasing battery resident amp-hour capacity. The method of the present invention addresses the problem of poor discharge voltage performance that occurs with battery age. Increasing battery temperature during discharge improves charge transfer within the electrolyte and in the nickel electrode active material. The method of the present invention does not provide an improvement in discharge voltage by increasing the charge capacity of the battery.

As the battery ages, normal battery aging processes reduce electrolyte availability by nickel electrode expansion (i.e., increase in electrode micropore volume) and nickel center corrosion. The net charge transfer through the electrolyte at the same temperature is reduced. The degraded discharge voltage performance for aged batteries is not solely related to electrolyte performance in the battery. Batteries are often constructed with more than adequate electrolyte to provide excellent discharge voltage performance at the operation temperatures maintained by spacecraft. However, as the battery ages, charge transfer processes within the electrode are impeded. Nickel electrodes tend to form a bimodal crystal phase structure that segregates and isolates dissimilar crystals from the current collector resulting in degraded voltage performance.

The method of the present invention provides for improving discharge voltage for a degraded, rechargeable battery that includes charging the battery at a charge temperature that corresponds to ambient spacecraft temperature, in the range from about −5° C. to about +10° C.; and discharging the battery at a discharge temperature in the range from about 2° C. to about 25° C. above the charge temperature.

The method of the present invention provides an improvement in battery discharge voltage by increasing battery temperature above which normally occurs during discharge. The increase in battery temperature during discharge is achieved by increasing battery temperature prior to discharge and maintaining the increased temperature during discharge. In one embodiment of the method, battery temperature is increased one hour prior to discharge. However, the length of time for increasing battery temperature prior to discharge is not critical and will depend on the characteristics of the battery, including its temperature control system, and the desired discharge temperature.

The method of the present invention provides active thermal control of battery temperature. Battery temperature can be controlled and regulated by any one of a variety of thermal control devices and methods known to those in the art. For example, battery temperature can be controlled by regulating the temperature of the battery baseplate upon which individual battery cells are mounted. Battery temperature can be controlled by throttling heat pipes that reject heat to space. Alternatively, the temperature of the battery's cells can be controlled by individual thermal control devices.

The active thermal control of battery temperature provided by the method of the invention can be accomplished through computerized control with associated active thermal management algorithms. For example, such control can assess whether the battery is either in a degraded discharge voltage performance condition, or will enter such a degraded condition during an eclipse season, or at what eclipse period will the voltage performance be inadequate, thus compromising payload operation. Through active thermal management algorithms, thermal control of battery discharge temperature can be activated to maintain the required discharge voltage performance. Furthermore, active thermal control of battery discharge temperature through such management algorithms efficiently utilizes valuable spacecraft power.

In the method, relatively minor increases in battery temperature during discharge appear to improve charge transfer processes within the aged battery and afford discharge voltage improvements approximately equal to those obtained from battery reconditioning. Charge temperature is not increased by the method and, therefore, battery charge control and full charge resident amp-hour capacity is not changed.

To better understand the method of the present invention, the operational principles of a nickel electrode battery are illustrative. Long-life nickel oxide electrodes are used in alkaline storage battery cells including, for example, nickel cadmium (Ni/Cd), nickel iron (Ni/Fe), nickel zinc (Ni/Zn), and nickel hydrogen (Ni/H$_2$) cells. The nickel electrode is a life-limiting component of these cells. The change in discharge voltage for heavily cycled nickel electrodes in nickel hydrogen cells has been attributed to crystal structure changes of the electrode's active material, nickel oxide/hydroxide, NiO(OH)$_2$. See, e.g., Lim and Verzwyvelt, "Electrochemical Behavior of Heavily Cycled Nickel Electrodes in Ni/H$_2$ Cells Containing Electrolytes of Various KOH Concentrations", Electrochemical Society Proceedings, Vol. 90–4, 1990, 341–355. See also, Lim, Verzwyvelt, and Element, "The Effect of Different Alkali Metal Hydroxides on Nickel Electrode Life", Proceedings of the 23rd Intersociety Energy Conversion Engineering Conference, Jul. 31–Aug. 5, 1988, page 2.457. Nickel oxide/ hydroxide active material is known to undergo transformation of crystal structures between β-phase and γ-phase. The γ-phase is characterized by having a higher nickel oxidation state (i.e., +3.5 to +3.7) than the β-phase, which has a nickel oxidation state of about +3.0. The β-phase can be oxidized to the γ-phase during extended charging and/or overcharging. Generally, the β-phase to γ-phase oxidation is facilitated with increasing electrolyte concentration or decreasing battery charge temperature. On discharge, the γ-phase provides a higher capacity than the β-phase and the γ-phase discharge voltage is lower than that of the β-phase.

The degradation of discharge voltage observed for cycled nickel electrodes can be attributed in part to a crystal structure change of the active material. The active material is initially a mixed state of β-phase and γ-phase. The β-phase gradually converts to the γ-phase with cycling. The overall effect of extended cycling and overcharging is the increase of γ-phase for the nickel electrode. Because the discharge voltage of the γ-phase is lower than that of the β-phase, the greater the γ-phase in a nickel electrode, the lower the overall discharge voltage of the electrode. This results in β-phase discharging at higher voltage than the γ-phase. Furthermore, once the β-phase has discharged, it becomes relatively nonconductive leading to the isolation of the γ-phase and degraded discharge performance.

By increasing discharge temperature, the method of the invention provides increased crystal phase charge transfer within the electrode and improved transfer through the electrolyte.

In the battery testing described below and illustrated in FIGS. 1–8, all test battery cells were rated at 83 amp hours of capacity; applied charge rates were 5.5 amp for high rate and 0.75 amp for trickle charge (low rate); and the discharge rate for all cycles was 25.4 amp although the period of discharge was varied as described herein.

Figure 2:
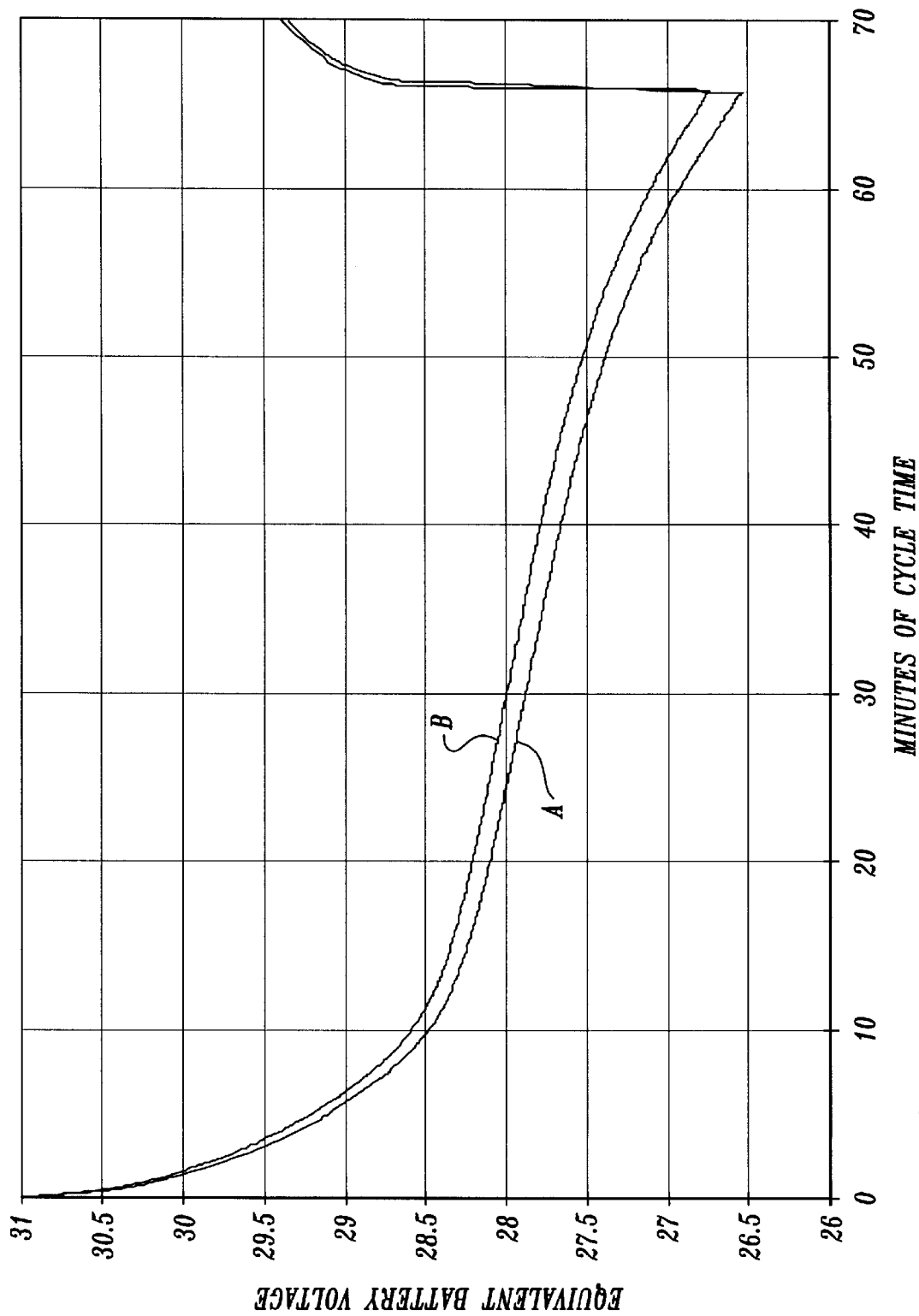
FIG. 2 is a comparison of successive discharge voltage profiles for the battery described above for FIG. 1; profile A illustrates the discharge voltage profile (volts) through a 66 min. discharge; and profile B illustrates the discharge voltage profile and its improvement in discharge voltage for the subsequent discharge after increasing the battery coolant temperature by 4° C. one hour before discharge.
Figure 3:
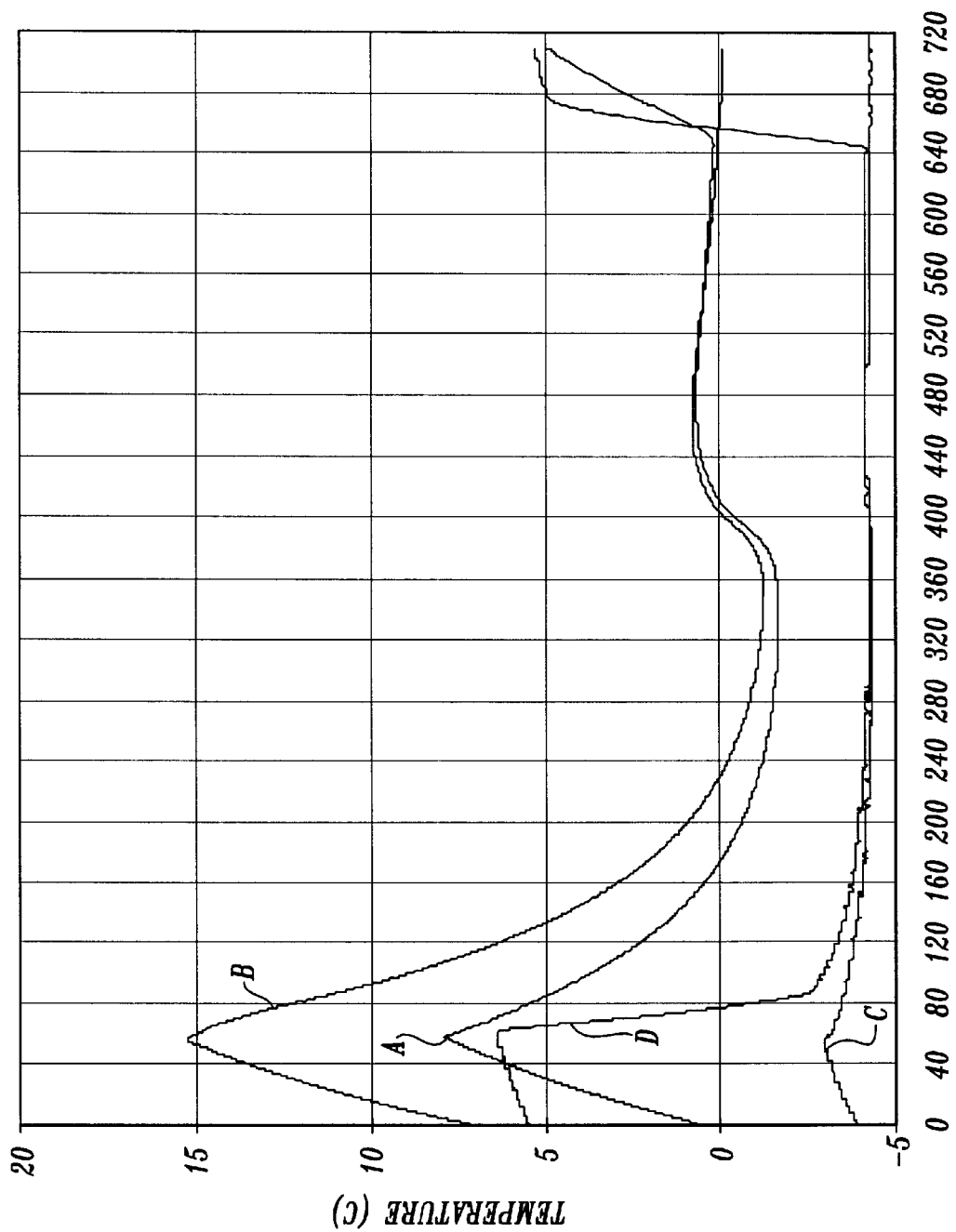
FIG. 3 is a comparison of temperature profiles for successive discharge/charge cycles for the battery described above for FIG. 1; profile A illustrates battery temperature over cycle time for a standard cycle; profile B illustrates battery temperature for a cycle after increasing the battery coolant temperature by 10° C. one hour before discharge; and profiles C and D illustrate battery coolant temperature at the baseplate for profiles A and B, respectively.
Figure 4:
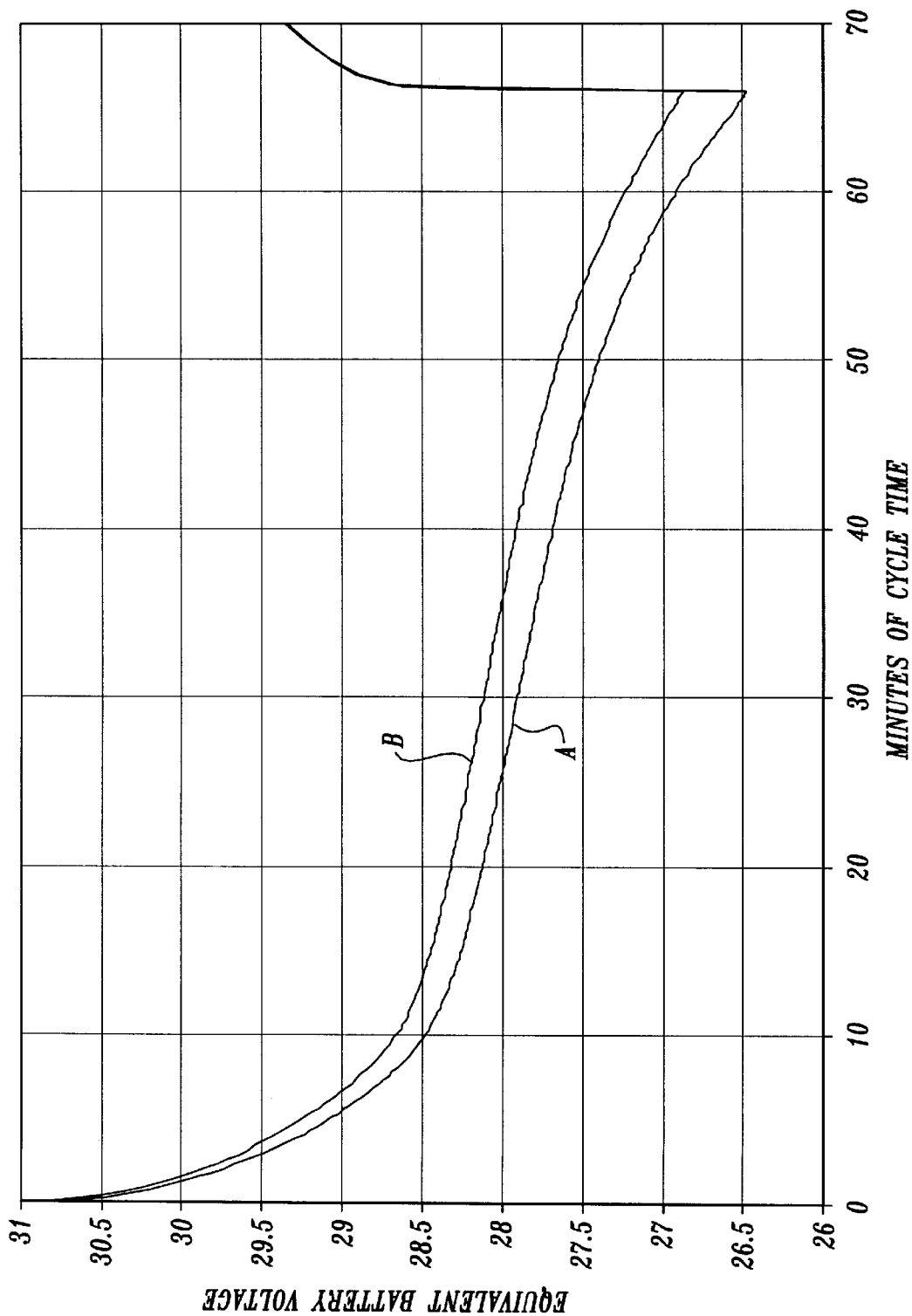
FIG. 4 is a comparison of successive discharge voltage profiles for the battery described above for FIG. 1; profile A illustrates the discharge voltage profile through a 66 min. discharge; and profile B illustrates the discharge voltage profile and its improvement in discharge voltage for the subsequent discharge after increasing the battery coolant temperature by 10° C. one hour before discharge.

In testing of aged nickel hydrogen cells (RNH76-3 cell design, Eagle Picher Industries, Joplin, Mo.), a 4° C. increase of battery coolant temperature one hour before discharge improved the discharge voltage profile by 0.2 volts in a 28 volt battery. A comparison of temperature profiles for successive discharge/charge cycles for the battery is compared in FIG. 1. Referring to FIG. 1, profile A illustrates battery temperature over cycle time for a standard cycle (i.e., a cycle during which there is no increase in battery temperature prior to discharge and no increase in battery temperature beyond that which occurs during normal spacecraft operation). Also shown in the figure is the increase in battery temperature that normally occurs during discharge. Profile B illustrates battery temperature for the following cycle after increasing the battery coolant temperature (i.e., battery baseplate temperature) by 4° C. one hour before discharge. Profiles C and D illustrate battery coolant temperature at the baseplate through these cycles. Discharge voltage profiles under the same 25.4 amp constant current load for these cycles are compared in FIG. 2. Referring to FIG. 2, for a 66 minute discharge, profile A illustrates the discharge voltage profile for discharge at normal operating temperature and profile B illustrates the discharge voltage profile and its improvement for the battery operated at increased discharge temperature in accordance with the method of the present invention. As shown in FIG. 1, a 4° C. increase in coolant temperature provided about a 2° C. increase in battery temperature measured on the cell at about 3.8 inches above the thermally regulated baseplate to which the cell is mounted. Increasing coolant temperature by 10° C. further improved discharge voltage, increasing discharge voltage by 0.5 volts in a 28 volt battery. A comparison of the temperature profiles for successive discharge/charge cycles for a battery operating under standard conditions and operating in accordance with the method of the present invention with a 10° C. coolant temperature increase is illustrated in FIG. 3. Profile A illustrates battery temperature for a standard cycle and profile B illustrates battery temperature for a subsequent cycle after increasing the battery coolant temperature by 10° C. one hour before discharge. A comparison of discharge voltage profiles for the successive discharge cycles noted above is shown in FIG. 4. Referring to FIG. 4, profile A illustrates the discharge voltage profile over a constant 25.4 amp, 66 minute discharge for a standard discharge and profile B illustrates the discharge voltage profile for the same discharge after increasing the battery coolant temperature by 10° C. Referring again to FIG. 4, a 10° C. increase in coolant temperature provided about a 5° C. increase in battery temperature.

The method of the present invention provides an improvement in discharge performance for an aged, rechargeable battery by increasing battery temperature by from about 2° C. to about 25° C. during discharge. Below about a 2° C. increase in discharge temperature, minimal improvement in discharge voltage is observed. Above about a 25° C. increase, other disadvantageous processes begin to occur and further improvements in discharge voltage are not observed. In a preferred embodiment, battery temperature is increased from about 4° C. to about 10° C. during discharge.

The method of the present invention affords an improvement in battery performance and operation that can significantly enhance the useful lifetime of satellite payloads. For a nominal discharge load requirement, the voltage plateau of a poor performing battery (e.g., a battery in need of reconditioning) is in the range of 26.8 to 25.5 volts. By the method of the present invention, such a discharge voltage profile can be increased to the 27.3 to 26.0 volt range. On some spacecraft, 26.8 volts is the lower support voltage limit of certain payload devices. Thus, the method of the present invention renders marginally operational batteries, which have diminished discharge voltage, useful in keeping payload devices operational for prolonged periods of time. The method of the invention is particularly useful in instances where battery reconditioning cannot be adequately accomplished. It is believed that by operating batteries in accordance with the present invention, an eight-year mission can be extended by several years.

Furthermore, because battery cycle life is inversely proportional (i.e., semi-log relationship) to depth of discharge, a secondary benefit of the higher voltage profile is that, for the same load, the net depth of discharge is decreased and therefore provides longer battery life.

The method of the present invention seeks to maximize long-term battery performance. The method maintains the battery's charge capacity over extended cycling. The method also extends the useful life of a battery and reduces the frequency of reconditioning. The method of the present invention can be used to improve satellite battery performance, thereby extending mission life and maintaining payload operation for longer revenue-generating periods.

The method of the present invention for increasing discharge voltage performance has been demonstrated for nickel hydrogen batteries. Representative nickel electrode batteries that can be advantageously operated by the method of the invention include, in addition to nickel hydrogen (NL/H$_2$) batteries, nickel cadmium (Ni/Cd), nickel iron (Ni/Fe), and nickel zinc (Ni/Zn) batteries, among others. Generally, any nickel electrode battery can be advantageously operated by the present method where the nickel electrode is the battery's performance limiting component. The method also has applicability to other battery systems that suffer from reduced charge transfer processes resulting from extended cycling or aging. Such battery systems include, for example, rechargeable lithium ion and lithium metal battery systems.

Figure 5:
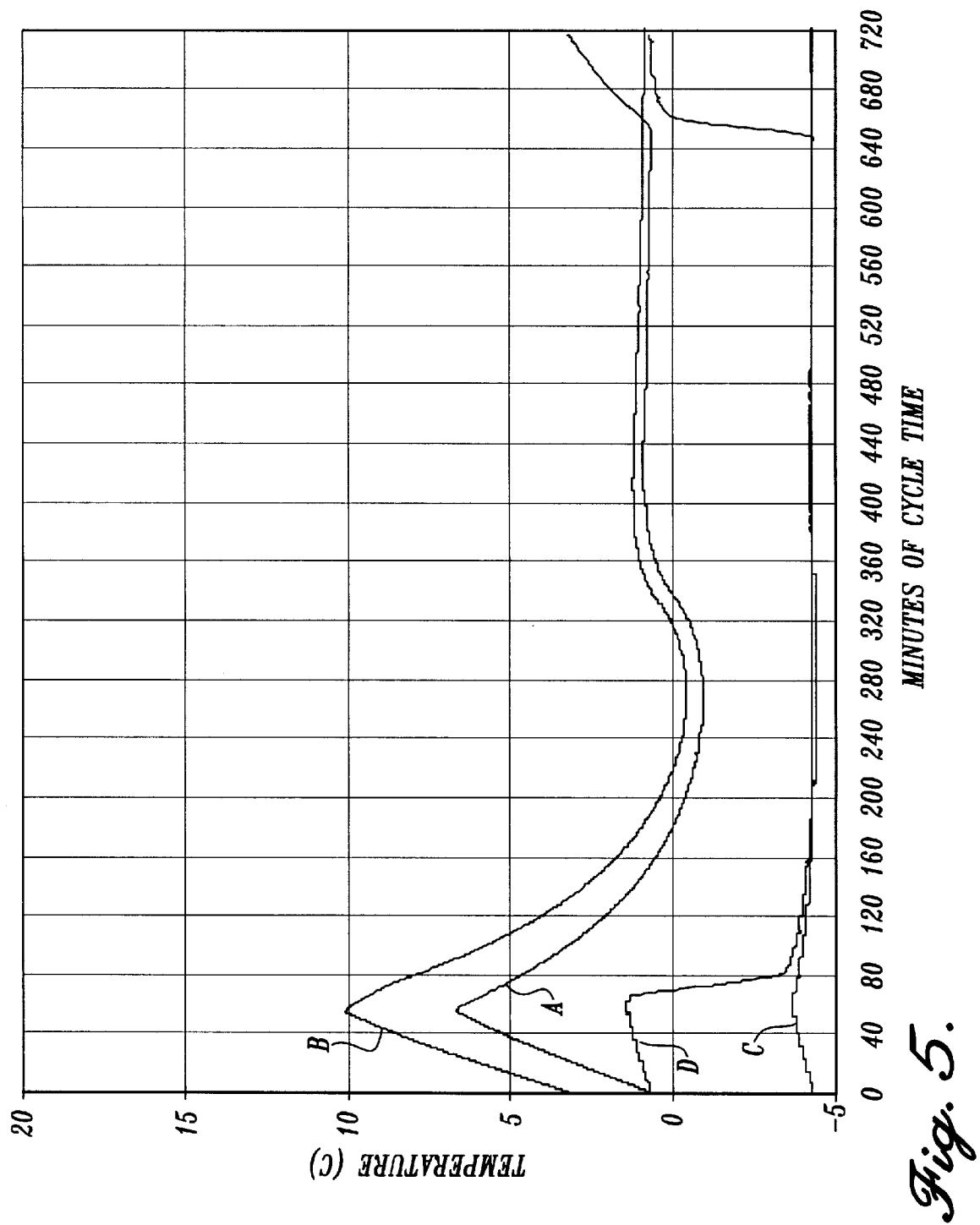
FIG. 5 is a comparison of temperature profiles for successive discharge/charge cycles for a nickel hydrogen alkaline storage battery (28 volt) having a cell design that includes a zirconium oxide separator and cell wall wicks; profile A illustrates battery temperature (° C.) measured on the cell at 3.8 inches above the battery baseplate over cycle time (min.) for a standard cycle; profile B illustrates battery temperature for a cycle after increasing the battery coolant temperature by 4° C. one hour before discharge; and profiles C and D illustrate battery coolant temperature at the baseplate for profiles A and B, respectively.
Figure 6:
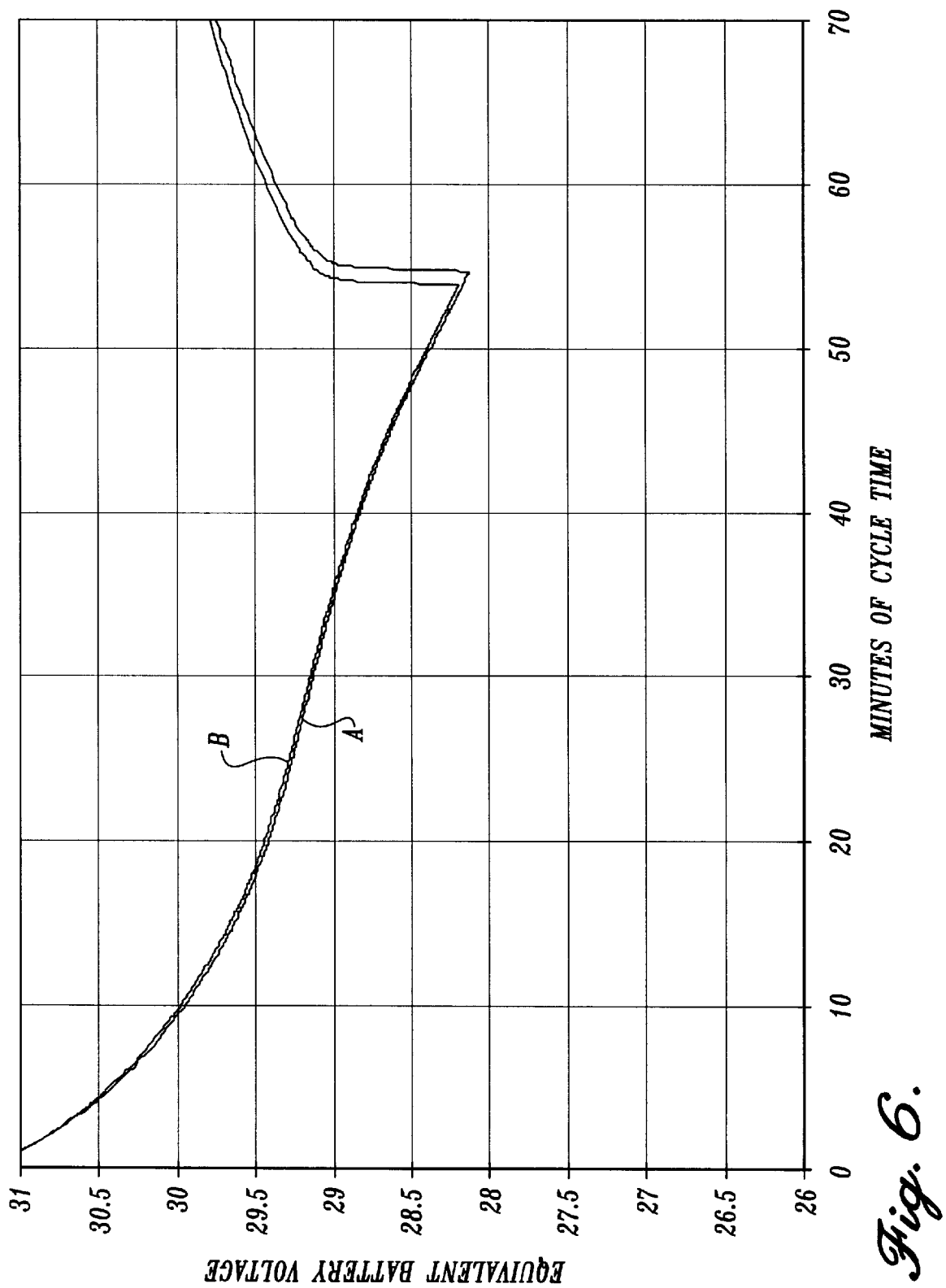
FIG. 6 is a comparison of successive discharge voltage profiles for the battery described above for FIG. 5; profile A illustrates the discharge voltage profile (volts) through a 55 min. discharge; and profile B illustrates the discharge voltage profile for the subsequent discharge after increasing the battery coolant temperature by 4° C. one hour before discharge.
Figure 7:
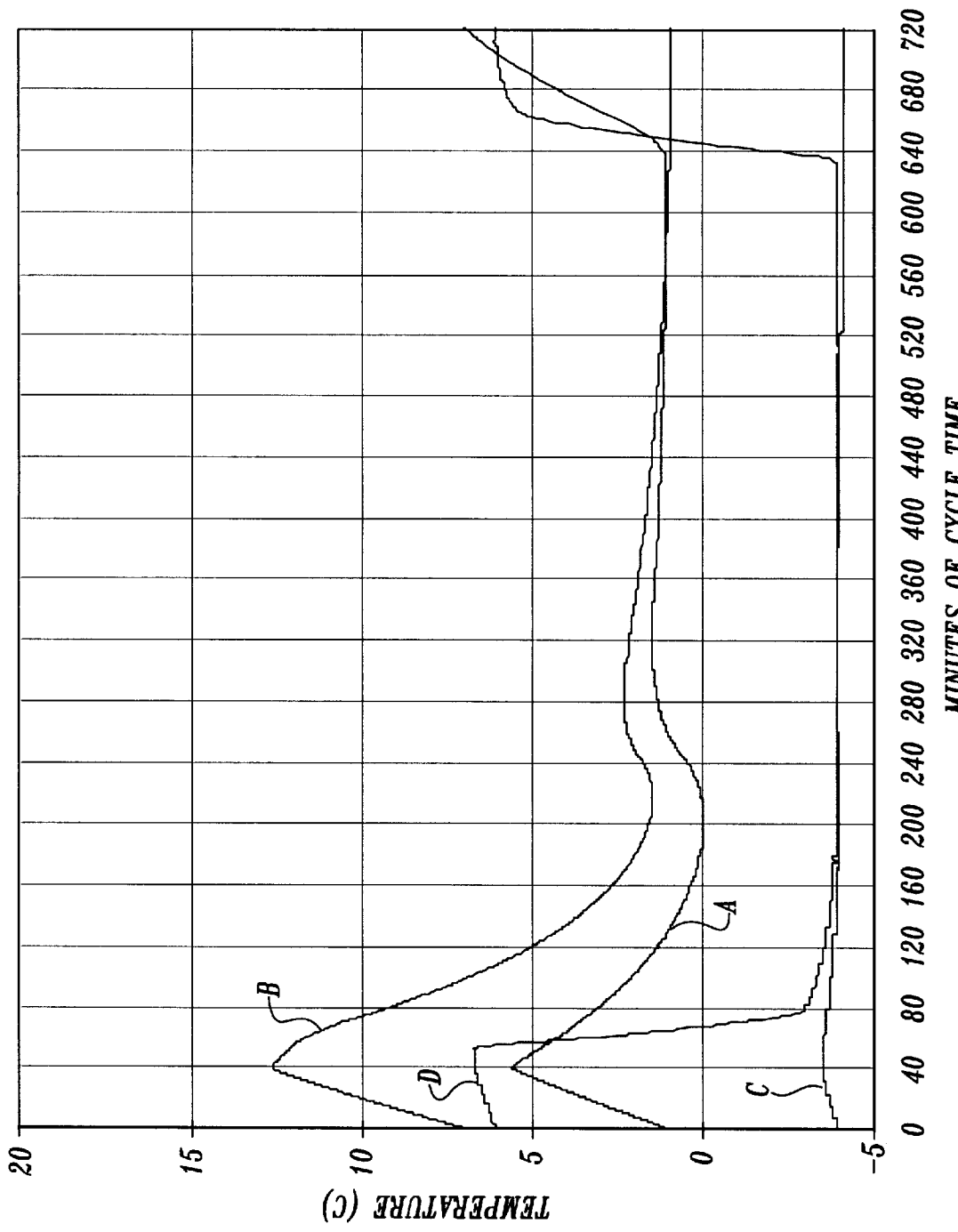
FIG. 7 is a comparison of temperature profiles for successive discharge/charge cycles for the battery described above for FIG. 5; profile A illustrates battery temperature over cycle time for a standard cycle; profile B illustrates battery temperature for a cycle after increasing the battery coolant temperature by 10° C. one hour before discharge; and profiles C and D illustrate battery coolant temperature at the baseplate for profiles A and B, respectively.
Figure 8:
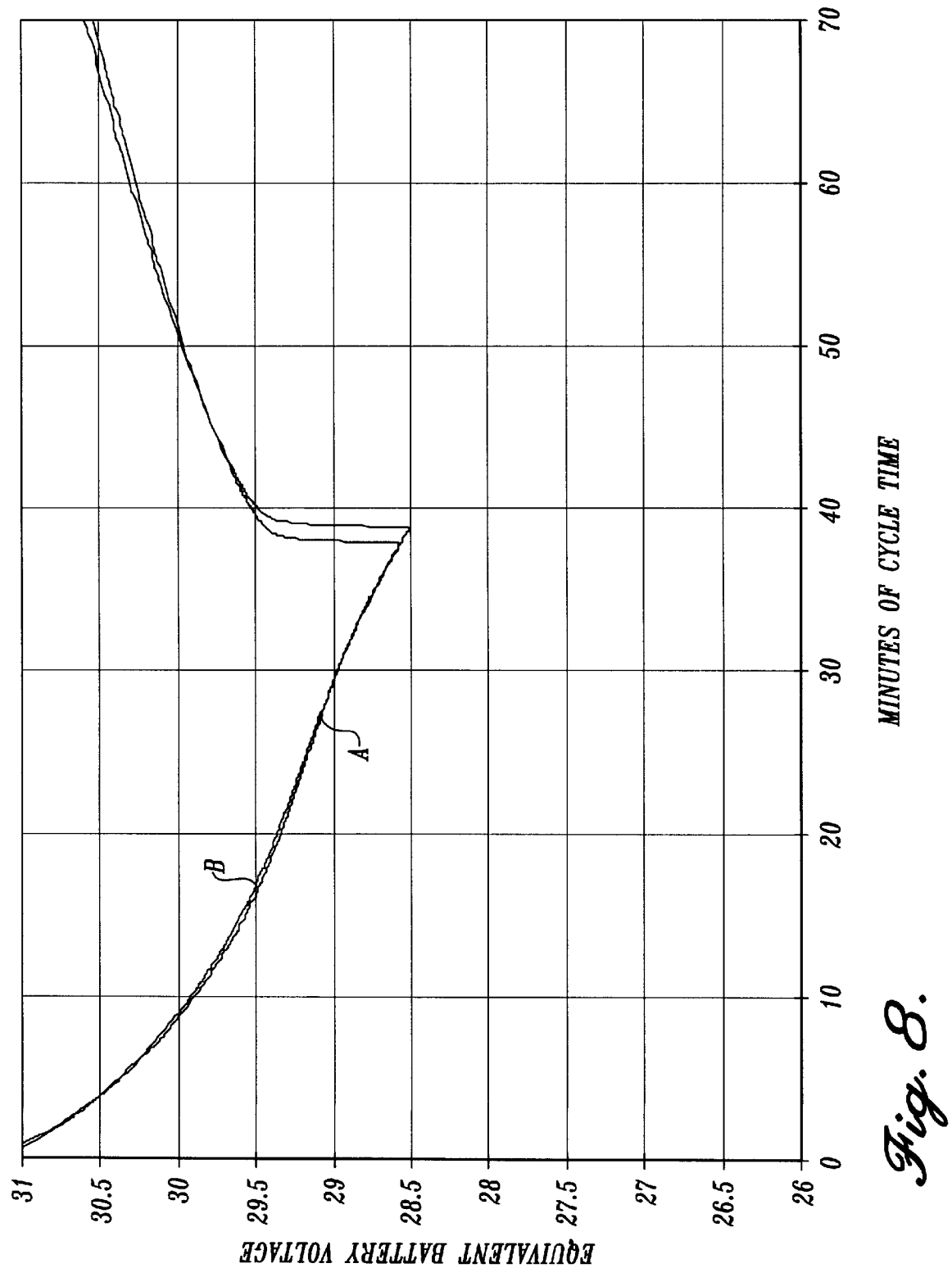
FIG. 8 is a comparison of successive discharge voltage profiles for the battery described above for FIG. 5; profile A illustrates the discharge voltage profile (volts) through a 38 min. discharge; and profile B illustrates the discharge voltage profile for the subsequent discharge after increasing the battery coolant temperature by 10° C. one hour before discharge.

While the method of the present invention has been demonstrated to be effective for nickel hydrogen batteries that exhibit degraded voltage performance, similar gains in discharge voltage performance were not observed for certain other cell designs. For example, increasing the discharge temperature for a nickel hydrogen battery having a zirconium oxide separator (i.e., RNH90-5 cell design, Eagle Picher Industries, Joplin, Mo.) did not result in an increase in discharge voltage as observed for the aged batteries noted above that were operated in accordance with the method of the present invention. Temperature profiles for successive discharge/charge cycles for the RNH90-5 battery are illustrated in FIG. 5 (comparing standard cycle and cycle having 4° C. coolant temperature increase) and FIG. 7 (comparing standard cycle and cycle having 10° C. coolant temperature increase). Discharge voltage profiles for successive battery discharges at coolant temperature increases of 4° C. and 10° C. are illustrated in FIGS. 6 and 8, respectively. As shown in FIG. 6, increasing the battery coolant temperature by 4° C. had no effect on the discharge voltage profile. Similarly, as shown in FIG. 8, increasing battery coolant temperature by 10° C. during discharge also did not increase discharge voltage.

Thus, while the method of the present invention significantly enhances the discharge voltage performance of degraded, rechargeable batteries, the method does not lead to increased stored capacity during charge, which would lead to even poorer discharge performance by increasing the amount of γ-phase crystalline material in the nickel electrode. In contrast to other methods for operating a battery that manipulate charge temperature, the method of the invention effectively enhances discharge voltage and prolongs the useful life of a battery by increasing battery temperature during discharge.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for improving discharge voltage for a degraded, rechargeable battery, comprising increasing battery temperature during discharge above the temperature normally occurring in battery operation.

2. The method of claim 1 wherein the battery temperature during discharge is in the range from about 2° C. to about 25° C. above the battery temperature normally occurring in battery operation.

3. The method of claim 1 wherein the battery temperature normally occurring in battery operation is in the range from about −5° C. to about +10C.

4. The method of claim 1 wherein the battery comprises a nickel electrode alkaline storage battery cell.

5. The method of claim 4 wherein the nickel electrode alkaline storage battery cell comprises a cell selected from the group consisting of nickel cadmium, nickel iron, nickel zinc, and nickel hydrogen cells.

6. The method of claim 1 wherein the battery comprises a nickel hydrogen cell.

7. The method of claim 1 wherein the battery comprises a nickel electrode.

8. The method of claim 7 wherein the nickel electrode comprises nickel oxide.

9. The method of claim 1 wherein the battery comprises a battery system selected from the group consisting of lithium ion and lithium metal battery systems.

10. The method of claim 1 wherein the battery temperature during discharge is in the range from about 2° C. to about 15° C. above the battery temperature normally occurring in battery operation.

11. The method of claim 1 wherein the battery temperature during discharge is in the range from about 4° C. to about 10° C. above the battery temperature normally occurring in battery operation.

12. The method of claim 1 wherein the battery temperature during discharge is controlled by battery baseplate temperature.

13. The method of claim 1 wherein the battery is a satellite energy storage source.

14. The method of claim 13 wherein the battery supports satellite eclipse loads.

15. The method of claim 1 wherein the battery temperature during discharge is controlled by an active thermal management algorithm.

16. A method for operating an aged, rechargeable battery, comprising the steps of:

charging the battery at a charge temperature, wherein the charge temperature is the nominal spacecraft temperature; and discharging the battery at a discharge temperature in the range from about 2° C. to about 25° C. above the charge temperature.

17. The method of claim 16 wherein the nominal spacecraft temperature is in the range from about −5° C. to about +10°C.

18. The method of claim 16 wherein the discharge temperature is in the range from about 2° C. to about 15° C. above the charge temperature.

19. The method of claim 16 wherein the discharge temperature is in the range from about 4° C. to about 10° C. above the charge temperature.

20. The method of claim 16 wherein the battery comprises a nickel electrode alkaline storage battery cell.

21. The method of claim 20 wherein the nickel electrode alkaline storage battery cell comprises a cell selected from the group consisting of nickel cadmium, nickel iron, nickel zinc, and nickel hydrogen cells.

22. The method of claim 16 wherein the battery comprises a battery system selected from the group consisting of lithium ion and lithium metal battery systems.

23. The method of claim 16 wherein the discharge temperature is controlled by an active thermal management algorithm.

* * * * *

UNITED STATES PATENT AND TRADEMARK OFFICE
CERTIFICATE OF CORRECTION

PATENT NO. : 6,054,842
DATED : April 25, 2000
INVENTOR(S) : S.A. Verzwyvelt et al.

It is certified that error appears in the above-identified patent and that said Letters Patent is hereby corrected as shown below:

COLUMN    LINE

7          65          "+10C." should read --+10° C.--
(Claim 3,  line 3)

Signed and Sealed this

Seventeenth Day of April, 2001

Attest:

NICHOLAS P. GODICI

Attesting Officer        Acting Director of the United States Patent and Trademark Office